US011951352B2

(12) United States Patent
Frankson

(10) Patent No.: US 11,951,352 B2
(45) Date of Patent: Apr. 9, 2024

(54) LOWER LATERAL ROTATION MUSCLES STRETCHING DEVICE

(71) Applicant: Andrew Maurice Frankson, Poughkeepsie, NY (US)

(72) Inventor: Andrew Maurice Frankson, Poughkeepsie, NY (US)

( * ) Notice: Subject to any disclaimer, the term of this patent is extended or adjusted under 35 U.S.C. 154(b) by 398 days.

(21) Appl. No.: 17/249,715

(22) Filed: Mar. 10, 2021

(65) Prior Publication Data

US 2021/0283462 A1 Sep. 16, 2021

Related U.S. Application Data

(60) Provisional application No. 62/987,588, filed on Mar. 10, 2020.

(51) Int. Cl.

| | |
|---|---|
| ***A63B 23/08*** | (2006.01) |
| ***A61H 1/02*** | (2006.01) |
| ***A63B 21/00*** | (2006.01) |
| ***A63B 23/035*** | (2006.01) |

(52) U.S. Cl.

CPC ......... *A63B 23/085* (2013.01); *A61H 1/0244* (2013.01); *A61H 1/0266* (2013.01); *A63B 21/4034* (2015.10); *A63B 21/4047* (2015.10); *A63B 23/03541* (2013.01); *A61H 2201/164* (2013.01)

(58) Field of Classification Search

CPC ................ A61H 1/0244; A61H 1/0266; A61H 2201/164; A63B 23/085; A63B 23/03541; A63B 21/4034; A63B 21/4047

See application file for complete search history.

(56) References Cited

U.S. PATENT DOCUMENTS

| | | | | |
|---|---|---|---|---|
| 8,062,189 | B1 * | 11/2011 | Moring, Jr. | A63B 71/0054 482/79 |
| 9,486,683 | B2 * | 11/2016 | Goodgame | A63B 69/0002 |
| 2007/0249476 | A1 * | 10/2007 | Hill | A63B 21/00047 482/148 |
| 2009/0111669 | A1 * | 4/2009 | Richter | A63B 21/4039 482/142 |
| 2016/0263424 | A1 * | 9/2016 | LaCaze | A63B 21/068 |
| 2018/0311102 | A1 * | 11/2018 | Frankson | A63B 21/00069 |

* cited by examiner

*Primary Examiner* — Timothy A Stanis

(74) *Attorney, Agent, or Firm* — Dunlap Bennett & Ludwig, PLLC

(57) ABSTRACT

A muscle stretching device comprises a base and a pair of footrests adjustably mounted to the base. The footrests may have an upper surface angled upwardly and a lateral portion height greater than a medial portion height thereof. The footrests may have an upstanding edge rim. The footrests may extend rearwardly from the base. The base may include front and rear fixation pins constructed and arranged to extend upwardly from a top surface of the base. Each footrest may comprise a front fixation opening for connection to a front fixation pin of the base, and a plurality of rear fixation openings for connection to a rear fixation pin of the base. The rear fixation openings may comprise a medial rear fixation opening, an intermediate rear fixation opening and a lateral rear fixation opening. The muscle stretching device may be used for stretching of the user's lower lateral rotation muscles.

4 Claims, 3 Drawing Sheets

LOWER LATERAL ROTATION MUSCLES STRETCHING DEVICE

CROSS-REFERENCE TO RELATED APPLICATION

This application claims the benefit of priority of U.S. Provisional Application No. 62/987,588, filed Mar. 10, 2020, the contents of which are herein incorporated by reference.

BACKGROUND OF THE INVENTION

The present invention relates to exercise and physical therapy equipment, and more particularly to a lower lateral rotation muscles stretching device.

Lateral rotation of the legs at the hips and lateral rotation of the feet at the ankles are both common problems. Overly contracted muscles may result from lateral rotation of the legs at the hips and feet at the ankles. Muscular imbalances may be a further consequence of tight lower lateral muscles.

No devices exist which passively stretch the lower lateral rotators of the legs and feet. Further available devices merely compound the problem by encouraging the shortening of other muscles to create a stretch.

No device exists which is able to assist with exercise and physical therapy to prevent or resolve these common issues. No device exists which permits the user to passively stretch muscles of the lower body.

A need exists for a device which assists a user to passively stretch the muscles of the lower body. A further need exists for a device which encourages and permits the user to achieve a stretch of the lower lateral rotators passively.

Accordingly, there is a need for a solution to all of these problems, which is capable of use in home, professional and medical settings.

SUMMARY OF THE INVENTION

Advantageously, in one aspect, the present invention provides a device for stretching lower lateral rotation muscles. The present invention is capable of use in correcting overly contracted muscles caused by lateral rotation of the legs at the hips, and feet at the ankles.

In one aspect, a muscle stretching device comprises a base and a pair of footrests adjustably mounted to the base. The footrests may have an upper surface angled upwardly and a lateral portion height greater than a medial portion height thereof. The footrests may have an upstanding edge rim. The footrests may extend rearwardly from the base. The base may include front and rear fixation pins constructed and arranged to extend upwardly from a top surface of the base. Each footrest may comprise a front fixation opening for connection to a front fixation pin of the base, and a plurality of rear fixation openings for connection to a rear fixation pin of the base. The rear fixation openings may comprise a medial rear fixation opening, an intermediate rear fixation opening and a lateral rear fixation opening. The muscle stretching device may be used for stretching of the user's lower lateral rotation muscles.

In a further aspect the present invention provides a lower lateral rotation muscles stretching device which permits a user to passively stretch muscles of the lower body. The device of the present invention encourages and allows the user to achieve a stretch of the lower lateral rotators passively.

In one aspect, the present invention may be beneficially used to correct overly contracted muscles caused by lateral rotation of the legs at the hips and feet at the ankles. The present invention may be used to solve the problem by encouraging medial rotation of the legs at the hip and ankle areas. The device of the present invention may be used to correct muscular imbalances caused by tight lower lateral leg muscles. The device of the present invention may be used to passively stretch the lower lateral rotators of the legs and feet. The device is constructed and arranged to encourage and allow the user to achieve a stretch of the lower lateral rotators passively.

The present invention provides an exercise and physical therapy device for stretching lower lateral rotation muscles which may be used in home or professional settings, and anywhere the user may sit. The device of the present invention may be beneficially used to resolve the problems of lateral rotation of the legs at the hips, lateral rotation of the feet at the ankles, overly contracted muscles and the muscular imbalances which may result from tight lower lateral muscles.

The present invention differs from and distinguishes over previous device which are not able to passively stretch the lower lateral rotators of the legs and feet, and merely compound the problem by encouraging the shortening of other muscles in order to create a stretch.

In one aspect, the present invention provides a stretching device comprising a base, a first foot rest and a second foot rest, the first and second foot rests being rotatably mounted to the base. The first foot rest and second foot rest may further comprise a first angled right foot rest and a second angled left foot rest. In some embodiments the device is constructed and arranged so that the base may hold each foot rest in a plurality of different foot rest positions. In use, the device will act on, or enable a user to act on a plurality of lower body bones and joints of the user and a plurality of lower body muscles of the user. Each of said plurality of foot rest positions may tilt and rotate a foot of a user medially. Rotation of the foot medially by the device will medially rotate an ankle joint of the user, which will encourage medial rotation of a knee of the user. This action creates a passive stretch in a plurality of muscles of the lower body that performs lateral rotation of the lower body bones and joints, such as the user's leg at the hip, and the user's foot at the ankle. The angled foot rests may be attached to the base and positioned to increase or decrease the passive stretches of the muscles that perform lateral rotation of the leg at the hip and foot at the ankle.

These and other features, aspects and advantages of the present invention will become better understood with reference to the following drawings, description and claims.

BRIEF DESCRIPTION OF THE DRAWINGS

The preferred embodiment of the claimed subject matter will hereinafter be described in conjunction with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

As used herein, "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, as there is no intention to be bound by any express or implied theory presented in the preceding technical field, background, brief summary or the following detailed description, it is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Broadly, one embodiment of the present invention provides a lower lateral rotation muscles stretching device.

Figure 1:
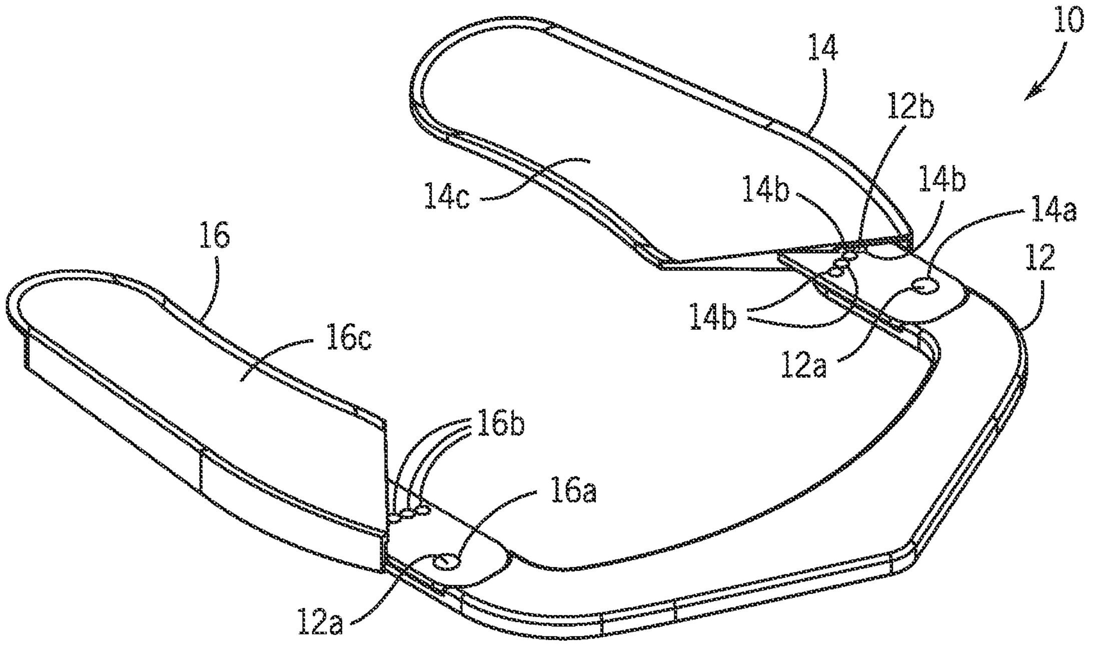
FIG. 1 is a perspective view of the invention.
Figure 2:
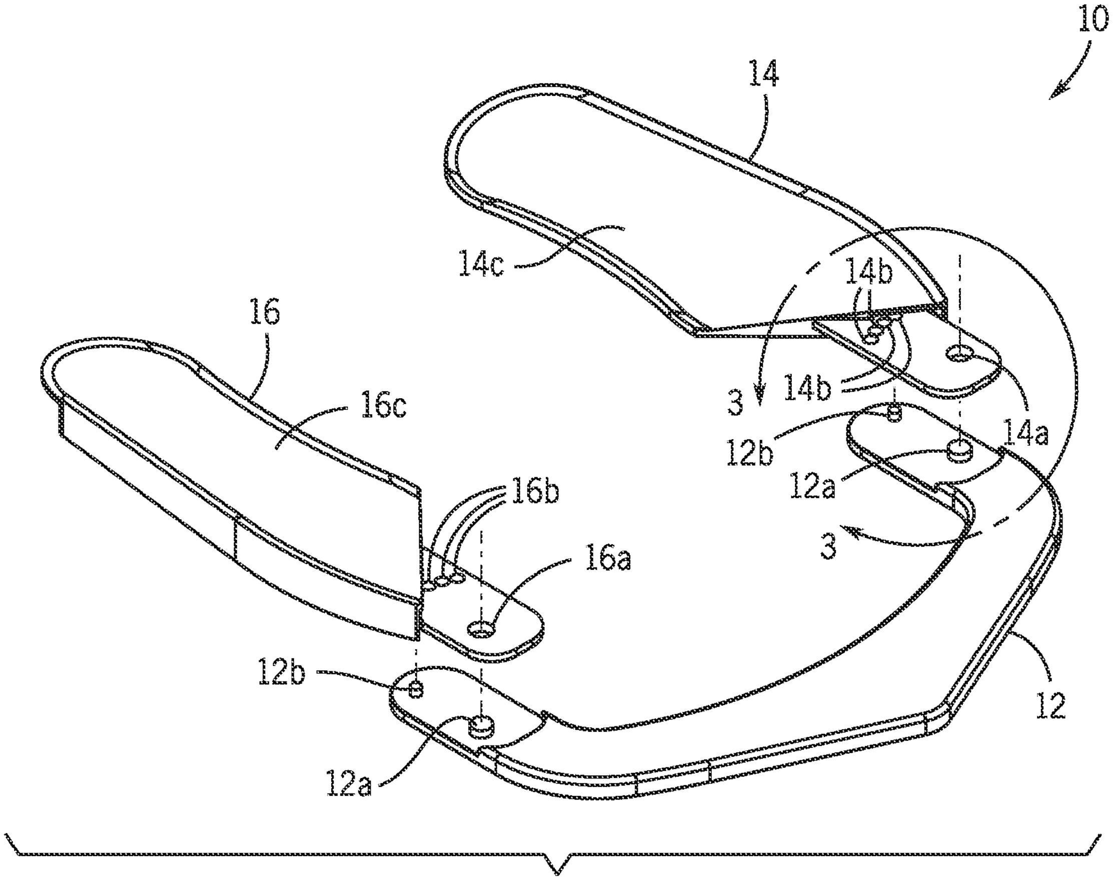
FIG. 2 is an exploded perspective view of the invention.

FIG. 1 provides a perspective view and FIG. 2 provides an exploded perspective view of the invention, a lower lateral rotation muscles stretching device, referred to generally at 10. The device 10 comprises a base 12 having a right side and a left side. The device further comprises a pair of adjustable angled footrests 16, 14. The footrests may be adjustably mounted to the base by any suitable securement element made of any suitable material.

In an exemplary embodiment, the base 12 comprises has front fixation pins **12*a* and rear fixation pins 12*b*. The device further comprises a pair of adjustable angled footrests, 16, 14. The angled right footrest 16 and the angled left footrest 14 are substantially identical mirror images, and are securely, adjustably mounted to, and extend rearwardly from, the base 12. Each angled footrest 16, 14 has an angled surface 16*c*, 14*c*** that is angled upwardly from a medial footrest portion to a lateral footrest portion so that the medial portion has a lower height than the lateral portion thereof.

Figure 3:
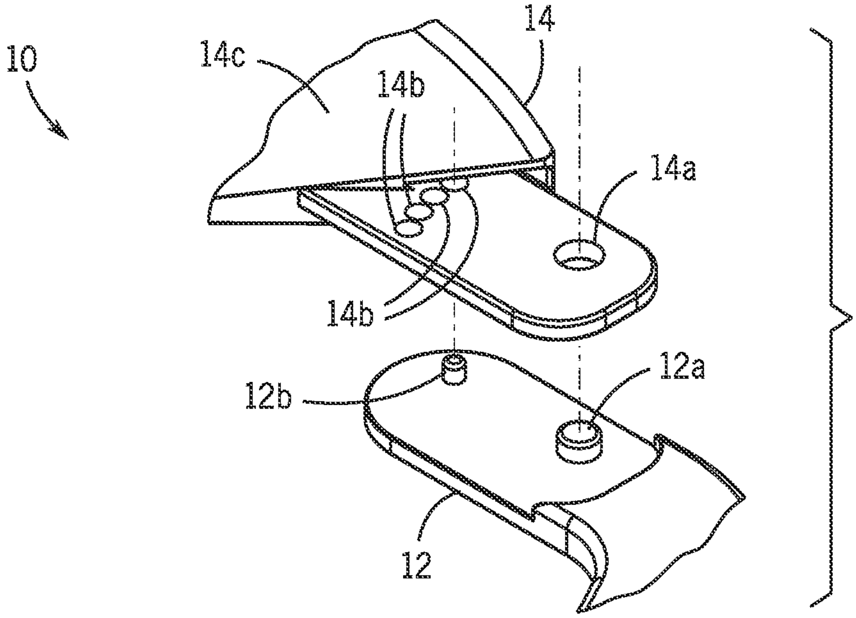
FIG. 3 is a detail exploded perspective view of the invention taken from line 3-3 FIG. 2.

The angled right footrest 16 comprises a front fixation opening **16*a* and plurality of rear fixation openings 16*b*, and the angled left footrest 14 comprises a front fixation opening 14*a* and a plurality of rear fixation openings 14*b*. As seen at FIGS. 1-3, and also at FIG. 3, a detail exploded perspective view of the invention taken along line 3-3 of FIG. 2 showing detail of a portion of the left angled footrest 14 as it is mounted to the left side of the base 12, it can be seen that the right angled footrest 16 is mounted to the left side of the base in the same manner. The front fixation openings 16*a*, 14*a* of the right and left footrests 16, 14 are constructed and arranged for secure connection to the front fixation pins 12*a* of the base 12. The rear fixation openings 16*b*, 14*b* of the right and left footrests 16, 14 are constructed and arranged to connect to the rear fixation pins 12*b* of the base 12. The plurality of rear fixation openings 16*b*, 14*b* of each footrest 16, 14** may comprise a medial rear fixation opening, an intermediate rear fixation opening and a lateral rear fixation opening.

The lower lateral rotation muscles stretching device and its components may be made of any suitable material fabricated by any suitable process. The device and its components may be made by 3D Printing, CNC Machining, by Molding for manufacturing, and combinations thereof. The device may be made using materials such as, for example without limitation, plastic, metal, and combinations thereof.

In some embodiments, each component of the invention may be made individually with 3D printing and CNC machining. In other embodiments, a mold may be designed and made to accommodate the manufacturing of each component of the device.

In an exemplary embodiment, the present invention comprises a base member, a right angled footrest, a left angled footrest, and securement element constructed and arranged for adjustable mounting of the footrests at different rotational positions. In some embodiments, each footrest may further comprise a lateral footrest lip or edge rim which may assist users who have more severe muscle imbalances. In situations where the user has overly contracted lateral rotator muscles, the footrest edge rim may stop the foot of the user from being forced off the footrest.

In some embodiments, the components may be arranged in different locations. For example, in some embodiments, the base may be located at the front of the device. In other embodiments, the base may be located at a middle portion of the device or a rear portion of the device. In such embodiments the fixation pins may be positioned at different locations on the base, and the fixation openings of the footrests may be positioned at different locations. In some embodiments, the base may be located at an intermediate position. In other embodiments the base may be located at a rear position. The fixation pins would be located to accommodate the position of the footrest. The fixation holes of the footrests would be located to accommodate the position of the fixation pins.

Figure 4:
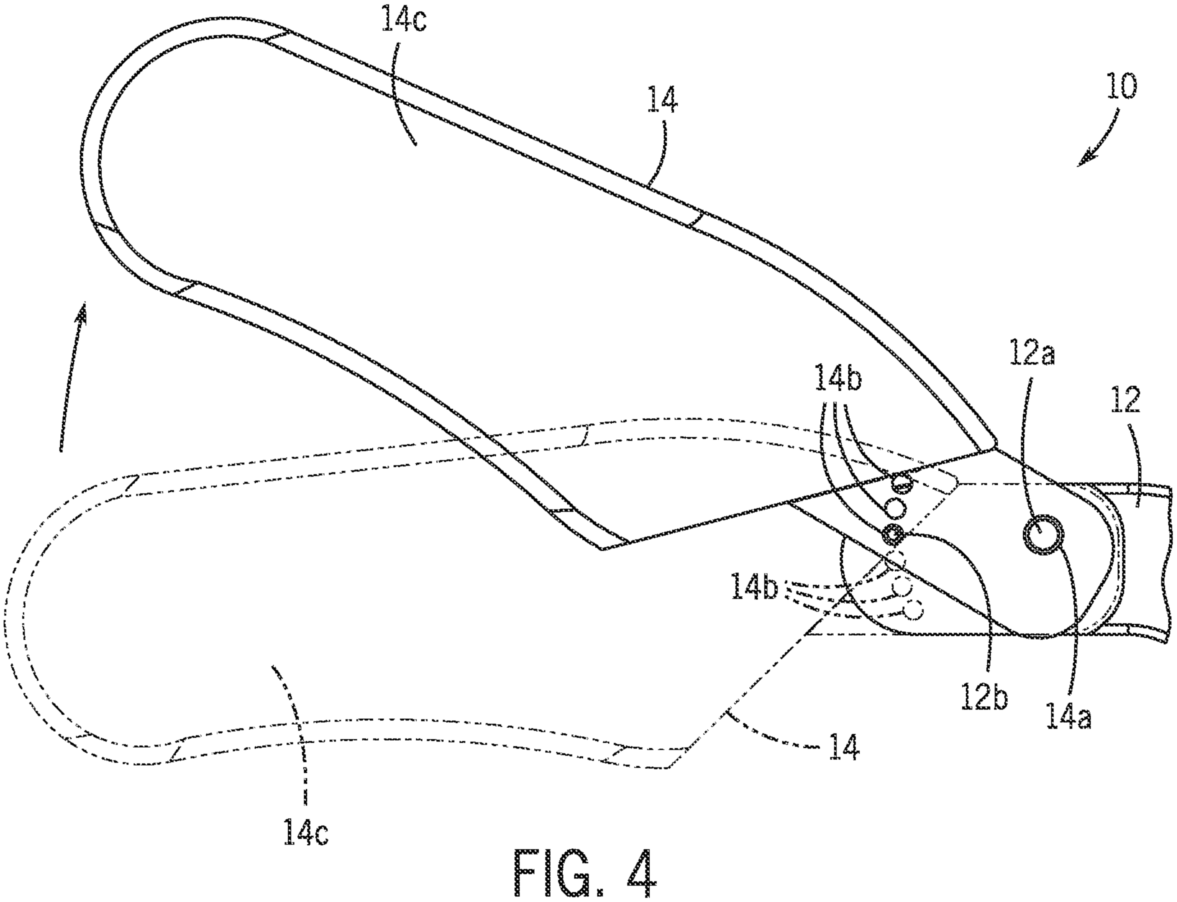
FIG. 4 is a top plan view of the invention.

With reference to FIG. 4, it is seen that the position of the footrests 16, 14 may be rotated about the front fixation pin **12*a* and held in place by connecting a selected rear fixation opening 16*b*, 14*b* to the rear fixation pins 12*b* of the base 12**. It is also seen that the right and left footrests are substantially identical mirror images and that in some embodiments, the right footrest may be installed on the left side of the base, and the left footrest may be installed on the right side of the base.

Figure 5:
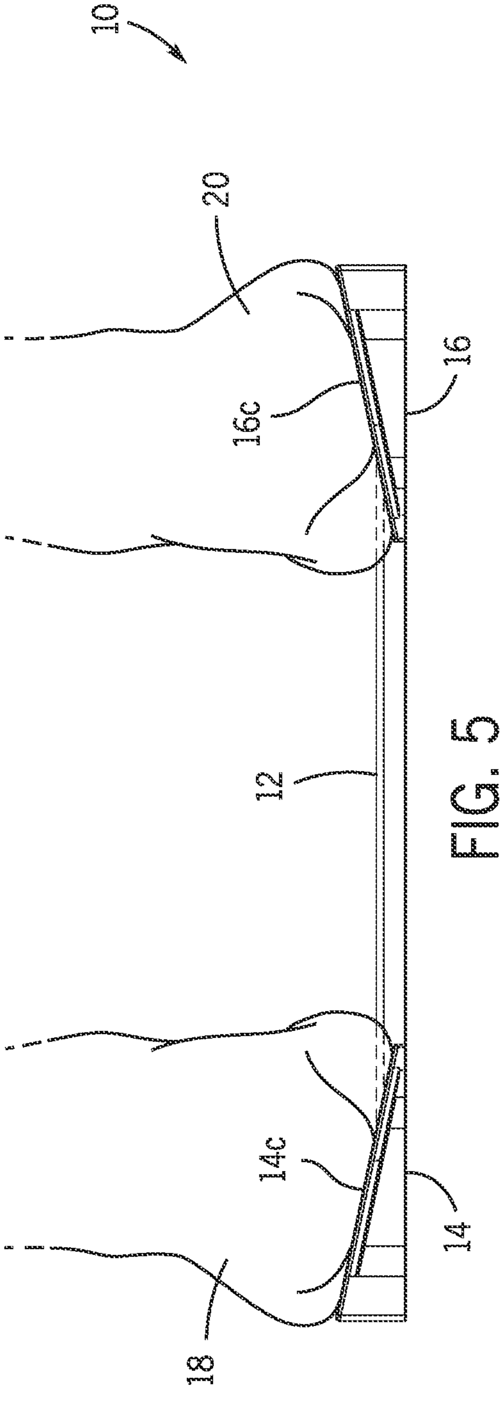
FIG. 5 is a rear elevation view of the invention in use in a first position.
Figure 6:
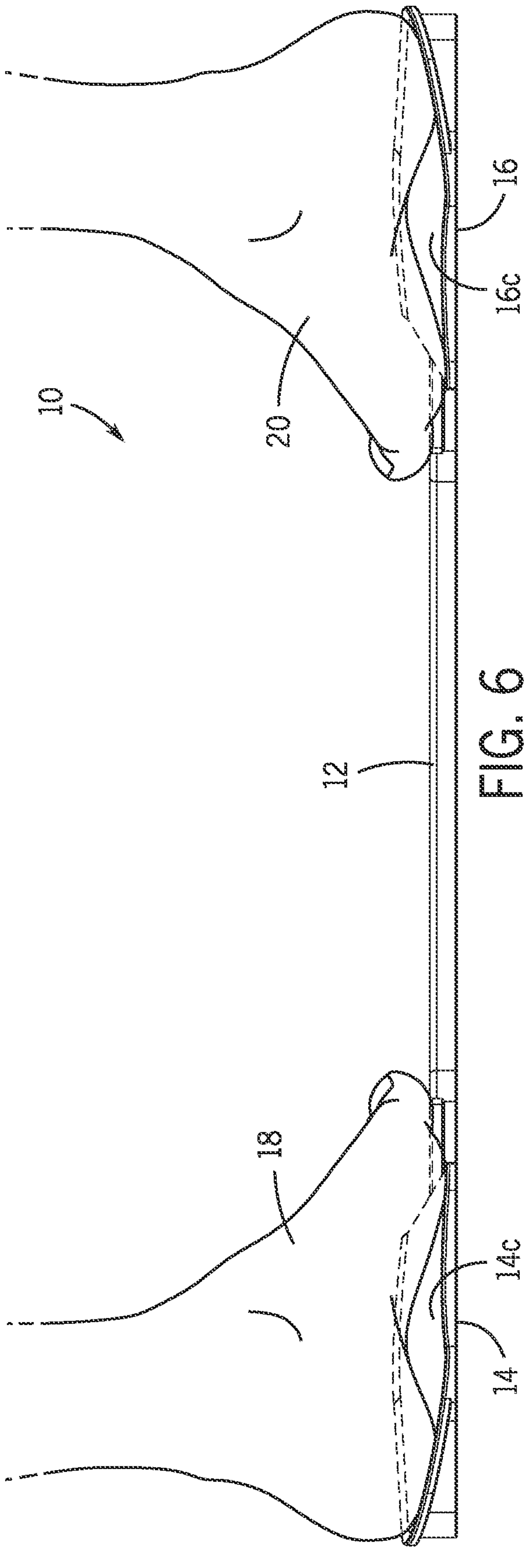
FIG. 6 is a rear elevation view of the invention in use in a second position.

Referring now to FIGS. 5-6, rear elevation views of the lower lateral rotation muscles stretching device 10 in use, with the right foot and left foot 20, 18 of a user, in place on the right and left footrests 16, 14. FIG. 5 shows rear elevation view of the invention in use in a first medial position, defined by the medial rear fixation openings of each footrest connected to the rear fixation pins of the base. FIG. 6 is a rear elevation view of the invention in use in a second lateral position, defined by the lateral rear fixation openings of each footrest connected to the rear fixation pins of the base. It can be seen that the footrests may be positioned in a third intermediate position defined by the intermediate rear fixation openings of each footrest connected to the rear fixation pins of the base. Further, as a plurality of rear fixation openings may be provided, it can be seen that the device may have a plurality of corresponding footrest positions. In addition, as noted hereinabove, additional footrest positions may be provided by installation of the right footrest on the left side of the base, and installation of the left footrest on the right side of the base.

In use, the base 12 holds the angled foot rests 16, 14 at different positions and angles, permitting the foot rests 16, 14 to tilt and rotate each foot 20, 18 medially. In use, the device medially rotates the feet at the ankles. This movement encourages the knees to medially rotate. This action creates a passive stretch in the muscles of the lower body that performs lateral rotation of the leg at the hip and foot at the ankle. The different positions of the foot rests may be selected to increase or decrease the passive stretches of the muscles that perform lateral rotation of the leg at the hip and foot at the ankle.

The lower lateral rotation muscles stretching device may be used at any time and in any location where the user is sitting. The device may be used in an office setting, while sitting on a sofa watching a movie or while having a meal at the dining table.

In an exemplary embodiment the present invention may provide a process for using a lower lateral rotation muscles stretching device including one or more of the following steps and combinations thereof. The user of the device may attach the right and left footrests 16, 14, to the base 12. The angled right footrest 16 and the angled left footrest 14 may be attached to the base 12 at the desired angle by placing each footrest on the base so the front fixation pin of the base is connected to the front fixation opening of the footrest, and the rear fixation pin is connected to one of the plurality of rear fixation openings that is selected to provide the desired position and angle of the footrest installed on the base. The user would then place the invention on a level floor or the ground. The user would then place the user's feet on the angled footrests of the lower lateral rotation muscles stretching device and relax. The angle of the footrest will create medial rotation of the user's foot at the ankle. The medial rotation of the foot at the ankle will create medial rotation of the leg at the hip. The creation of medial rotation of the lower limbs, will cause a passive stretch in the muscles that do lateral rotation of the leg at the hip and foot at the ankle.

In some embodiments, the lower lateral rotation muscles stretching device may be used in a different manner, such as, for example without limitation, to passively stretch the calf muscles. By making the angled footrest capable of pointing upwards and being angled both inwards and outwards when needed, the invention would be able to stretch both lateral and medial heads of the calf muscles.

In summary, the present invention provides a lower lateral rotation muscles stretching device constructed and arranged for use to permit passive stretching of the user's lower lateral rotator muscles. The stretching device may comprise a base, a first foot rest and a second foot rest, the first and second foot rests being rotatably mounted to the base. The first foot rest and second foot rest may further comprise a first angled right foot rest and a second angled left foot rest. In some embodiments the device is constructed and arranged so that the base may hold each foot rest in a plurality of different foot rest positions. In use, the device will act on, or enable a user to act on a plurality of lower body bones and joints of the user and a plurality of lower body muscles of the user. Each of said plurality of foot rest positions may tilt and rotate a foot of a user medially. Rotation of the foot medially by the device will medially rotate an ankle joint of the user, which will encourage medial rotation of a knee of the user. This action creates a passive stretch in a plurality of muscles of the lower body that performs lateral rotation of the lower body bones and joints, such as the user's leg at the hip, and the user's foot at the ankle. The angled foot rests may be attached to the base and positioned to increase or decrease the passive stretches of the muscles that perform lateral rotation of the leg at the hip and foot at the ankle.

In some embodiments, a muscle stretching device comprises a base and a pair of footrests adjustably mounted to the base. The footrests may have an upper surface angled upwardly and a lateral portion height greater than a medial portion height thereof. The footrests may have an upstanding edge rim. The footrests may extend rearwardly from the base. The base may include front and rear fixation pins constructed and arranged to extend upwardly from a top surface of the base. Each footrest may comprise a front fixation opening for connection to a front fixation pin of the base, and a plurality of rear fixation openings for connection to a rear fixation pin of the base. The rear fixation openings may comprise a medial rear fixation opening, an intermediate rear fixation opening and a lateral rear fixation opening. The muscle stretching device may be used for stretching of the user's lower lateral rotation muscles.

It should be understood, of course, that the forgoing relates to exemplary embodiments of the invention and that modifications, variations and changes in detail may be made without departing from the spirit and scope of the invention as set forth in the following claims.

What is claimed is:

1. A muscle stretching device, comprising:

a base having a right side, a left side, a front portion, a rear portion, a top surface and a bottom surface;

a pair of footrests adjustably mounted to the base, the pair of footrests further comprising a right footrest and a left footrest, each said right and left footrest having a front portion, a rear portion, a medial portion and a lateral portion, wherein the upper surface of each footrest further comprises an upstanding edge rim bordering the lateral portion thereof, wherein each footrest comprises an upper surface that is angled upwardly from the medial portion to the lateral portion, wherein a lateral portion height of the upper surface is greater than a medial portion height thereof, wherein the lateral portion height is maximum at an interface of the upstanding edge rim and the upper surface, and wherein the upstanding edge rim projects upward from said interface, whereby the upper surface is configured to create medial rotation of a foot of a user at a respective ankle of the user so that a resulting force imparted by the upstanding edge rim on a respective lateral side of said foot provides a passive stretching to lower lateral rotation muscles of said user, and wherein each footrest extends rearwardly from the base;

the base further comprises a pair of front fixation pins further comprising a right front fixation pin and a left front fixation pin, each said front fixation pin constructed and arranged to extend upwardly from the top surface of the base;

the base further comprises a pair of rear fixation pins further comprising a right rear fixation pin and a left rear fixation pin, each said rear fixation pin constructed and arranged to extend upwardly from the top surface of the base;

the right footrest and the left footrest each further comprise a front fixation opening constructed and arranged for connection to the right front fixation pin or the left front fixation pin of the base; and the right footrest and the left footrest each further comprise a plurality of rear fixation openings, each fixation opening of said plurality of rear fixation openings being constructed and arranged for connection to the right rear fixation pin or the left rear fixation pin of the base, wherein said fixation pins are spaced apart from the footrests and configured to be viewed by a user looking downward.

2. The muscle stretching device of claim 1 wherein the upstanding edge rim further borders the rear portion.

3. The muscle stretching device of claim 1 wherein the plurality of rear fixation openings further comprises a medial rear fixation opening, an intermediate rear fixation opening and a lateral rear fixation opening.

4. The muscle stretching device of claim 1, wherein the muscles stretching device is configured to provide stretching to lower lateral rotation muscles.

* * * * *